United States Patent Office 3,536,700
Patented Oct. 27, 1970

3,536,700
PROCESS FOR THE PURIFICATION OF α-AMINOLACTAMS
Albertus H. Pécasse and Johannes E. Nelemans, Geleen, Netherlands, assignors to Stamicarbon N.V., Heerlen, Netherlands
No Drawing. Filed May 3, 1967, Ser. No. 635,674
Claims priority, application Netherlands, May 7, 1966, 6606261
Int. Cl. C07d 41/06
U.S. Cl. 260—239.3                                    6 Claims

ABSTRACT OF THE DISCLOSURE

A process for the purification of α-aminolactams is described wherein a polar solvent solution thereof is passed over a cation exchanger in the presence of ammonia and then over a strongly basic anion exchanger. Iron impurities may be preliminarily removed as a ferric hydroxide precipitate after treatment of the solution with a mild oxidizing agent.

---

The present invention relates to a process for the purification of α-aminolactams, in particular α-aminolactams prepared by catalytic hydrogenation of the corresponding α-nitrolactams.

In the catalytic hydrogenation of an α-nitrolactam, the α-aminolactam solution obtained after completion of the hydrogenation reaction contains, in addition to the α-aminolactam, various impurities. These impurities include those that were already present in the nitrolactam before hydrogenation, impurities formed during the hydrogenation, and impurities originating from the catalyst used in the hydrogenation. The α-aminolactam can be recovered in its pure form from this solution by vacuum distillation thereof; however, in such a purification, a considerable portion of the α-aminolactam is lost, since α-aminolactams are thermally unstable.

According to another method of purification (see the Dutch patent specification No. 120,609), the α-aminolactam aqueous solution to be purified is mixed with a hydrocarbon of the benzene series, after which the water is removed by distillation, and, subsequently, the precipitated impurities are separated from the α-aminolactam solution. In this method, a solution of the α-aminolactam in the aromatic hydrocarbon is obtained from which the pure α-aminolactam can be recovered. While in this process hardly any aminolactam is lost, its drawback is that a large amount of aromatic hydrocarbon is required in comparison with the amount of water to be removed by distillation.

The present invention provides a process for the purification of α-aminolactams which avoids the disadvantages of the above-mentioned well-known purification methods. By contrast, the process of this invention involves the steps of passing a solution of the α-aminolactam in a polar solvent, and in the presence of ammonia, over a cation exchanger, and subsequently, whether or not in the presence of ammonia, over a strongly basic anion exchanger. Suitable polar solvents are, for instance, water and water-miscible lower alkanols, such as methanol, ethanol and butanol.

If the unpurified solution of the α-aminolactam contains iron, this is preferably removed before the solution is passed over the cation exchanger, since it has been found that in the absence of iron, the cation exchanger is more efficacious. Any iron in the solution is present in the bivalent form, since trivalent iron is precipitated as ferric hydroxide in the alkaline medium of the aminolactam solution. The removal of the iron from the α-aminolactam solution is preferably effected by treating it with a mild oxidizing agent, to convert the ferrous iron to ferric iron, and separating out the resulting precipitate.

The mild oxidizing agent so used may be, e.g., hydrogen peroxide, but for reasons of economy, air is preferred. As a result of the action of the mild oxidizing agent, the bivalent iron is converted to and precipitated as ferric hydroxide. The precipitation of ferric hydroxide in a form in which it can easily be separated from the liquid can be promoted by the presence of ammonia. By preference, therefore, the removal of the iron is effected by treating the solution of the α-aminolactam with the mild oxidizing agent in the presence of ammonia. This should not cause any difficulty, since ammonia should be present in any event when the solution is passed over the cation exchanger.

Various cation exchangers and strongly basic anion exchangers can be used in carrying out the process according to the invention. Among the strongly basic anion exchangers, preference exists for the type of strongly basic anion exchanger known commercially as Dowex 21 k, which is a trimethylammonium polystyrene cross-linked with divinyl benzene. This is due to the fact that Dowex 21 k requires less regenerating liquid than the regeneration of other strongly basic anion exchangers. The regeneration of the strongly basic anion exchanger can be effected by known methods, for instance, by means of 1 N hydroxide solution. The cation exchanger can likewise be regenerated in a known way, e.g., with 1 N nitric acid.

In practice of this invention the best results are achieved if the solution is passed over the cation exchanger at a temperature of about 50° and 60° C., and over the strongly basic anion exchanger at about room temperature; however, these temperatures need not be critically controlled.

In the following example, the process according to the present invention will be further explained by reference to the purification of α-amino-ε-caprolactam. However, the process according to the invention can also be applied to the purification of other α-aminolactams, for instance, α-amino-valerolactam and α-amino-oenantholactam.

EXAMPLE

An aqueous ammoniacal solution of α-amino-ε-caprolactam, obtained by hydrogenation of α-nitro-ε-caprolactam with a Raney nickel catalyst, was prepared. In addition to 20% by weight of α-amino-ε-caprolactam, this solution contained 3% by weight of ammonia, 0.6% by weight of lysine, 0.05% by weight of α-nitro-ε-caprolactam, and 0.6% by weight of other impurities. The latter consisted mainly of iron, nickel, chloride, sulphate, carbonate, aluminate, nitrate and hydrogenation intermediates.

1000 kg. of this solution is introduced into a vessel, provided with a stirrer, after which air is passed through the solution for 15 minutes, with stirring. A precipitate is formed, which is subsequently filtered off. The resulting filtrate is passed, at a temperature of about 55° C., over a column 10 cm. in diameter and 130 cm. high, filled with a cation exchanger in the H+ form commercially known as Dowex 50 (sulphonated polystyrene cross-linked with divinyl benzene). The cation exchanger is subsequently washed with 10 kg. of ammonia water (strength: 12% by weight), and the washing liquid is added to the solution passed over the cation exchanger. At room temperature the eluted liquid is passed over a column 45 cm. in diameter and 200 cm. high, filled with a Dowex 21 k anion exchanger in the OH− form (trimethyl ammonium base of polystyrene, cross-linked with divinyl benzene). The anion exchanger is then washed with water and the washing liquid is added to the effluent from the anion exchanger.

The process results in the production of 1407 kg. of an ammoniacal solution containing 14.2% by weight of α-amino-ε-caprolactam, 0.1% by weight of lysine, and less than 0.01% by weight of other impurities, from which the ammonia can be easily recovered for example by distillation. It appears that hardly any loss of α-amino-ε-caprolactam is sustained by this purification method.

It will be appreciated that other ion exchange resins may also be employed. For instance, in place of Dowex 50, there may be used Ionac C-240. In place of Dowex 21 k, there may be used Ionac A-540.

Furthermore, as stated above, the invention may be practiced essentially according to the process of the example, except using a non-polar solvent such as a lower alkanol, miscible with water, but for economical reasons, it is preferred to use water.

The practice of this invention is accordingly limited only by the spirit and scope of the following claims.

What is claimed is:

1. Process for the purification of α-aminolactams which are obtained by the catalytic hydronation of the corresponding nitrolactam and which α-aminolactams contain organic and inorganic impurities originally present in the nitrolactam, impurities formed during the hydrogenation of the nitrolactam and impurities present in the hydrogenation catalyst employed, said purification process comprising first treating a polar solvent solution of the α-aminolactam to be purified in the presence of ammonia with a cation exchange resin, and thereafter treating the solution eluted from said cation exchange resin, with or without the presence of ammonia, with a strongly basic anion exchange resin, whereby a polar solvent solution of α-aminolactam is obtained substantially free from impurities.

2. Process according to claim 1, in which said polar solvent solution of the α-aminolactam is preliminarily treated with a mild oxidizing agent so that any iron impurity in the solution is oxidized to ferric iron and precipitated as $Fe(OH)_3$, and separating out the resulting precipitate before said treatment with said cation exchange resin.

3. Process according to claim 2, wherein said mild oxidizing agent is air.

4. Process according to claim 2, wherein the mild oxidizing agent treatment is carried out in the presence of ammonia.

5. Process according to claim 1, wherein said strongly basic anion exchange resin used is trimethylammonium polystyrene cross-linked with divinyl benzene.

6. Process according to claim 1, wherein said polar solvent solution is passed over the cation exchange resin at a temperature between about 50° and 60° C., and over the anion exchange resin at about room temperature.

References Cited

UNITED STATES PATENTS

| 3,052,670 | 9/1962 | Ottenheym et al. | 260—239.3 |
| 3,145,198 | 8/1964 | Morbidelli et al. | 260—239.3 |
| 2,786,052 | 3/1957 | Kampschmidt | 260—239.3 |

FOREIGN PATENTS

| 164,657 | 8/1955 | Australia. |
| 954,207 | 4/1964 | Great Britain. |

JOHN D. RANDOLPH, Primary Examiner

R. T. BOND, Assistant Examiner

U.S. Cl. X.R.

260—294.7